(No Model.)
J. F. WILMOT.
VEHICLE SEAT.
No. 576,419.  Patented Feb. 2, 1897.
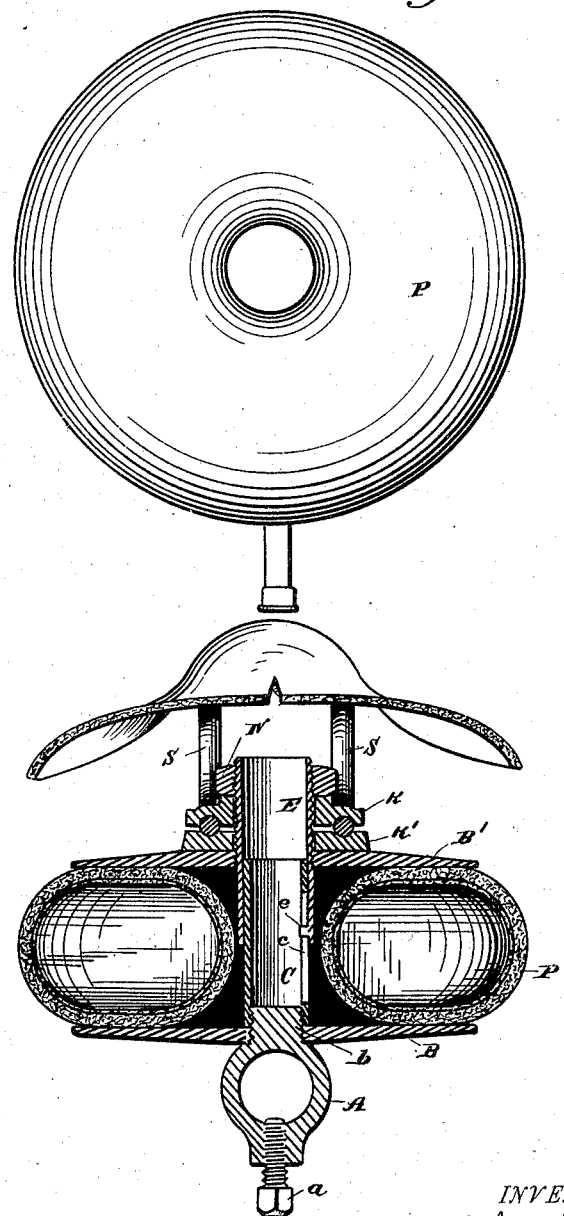
WITNESSES
D. W. Bradford
Virginia M. Clough
INVENTOR
John F. Wilmot
By Parker & Burton
Attorneys.
THE NORRIS PETERS CO., PHOTO-LITHO., WASHINGTON, D. C.

UNITED STATES PATENT OFFICE.

JOHN F. WILMOT, OF DETROIT, MICHIGAN.

VEHICLE-SEAT.

SPECIFICATION forming part of Letters Patent No. 576,419, dated February 2, 1897.

Application filed June 27, 1896. Serial No. 597,166. (No model.)

*To all whom it may concern:*

Be it known that I, JOHN F. WILMOT, a citizen of the United States, residing at Detroit, county of Wayne, State of Michigan, have invented a certain new and useful Improvement in Vehicle-Seats; and I declare the following to be a full, clear, and exact description of the invention, such as will enable others skilled in the art to which it pertains to make and use the same, reference being had to the accompanying drawings, which form a part of this specification.

This invention relates to vehicle-seats, and has for its object an improved pneumatic support adapted to be interposed between the frame and the seat and to afford a yielding and elastic cushion between the seat and the support or frame of the vehicle, while still retaining the hard surface of which the seat proper is usually made, and also the seat is removed from the cushion far enough to be completely ventilated and is entirely unaffected in shape by the change that is produced in the cushion when weight is placed upon it.

Another feature of this invention is that the seat retains its position with respect to the vertical line and is neither canted to one side nor twisted by the weight, although it can rise and fall readily on its cushioning support.

For the purpose of illustrating the invention I show it as applied to a bicycle.

In the drawings, Figure 1 shows a vertical section across the saddle, the cushion, and the various parts that support the saddle. Fig. 2 is a plan view of the pneumatic support or cushion.

A indicates the clip-ring adapted to be slipped onto the arm that rises from the saddle-post, and $a$ indicates the set-screw by which this ring is held to the arm. That side of the clip-ring A which is normally above the arm terminates with a threaded shank $b$, on which is run a bearing-plate B and a vertical tube C. The bearing-plate B has a diameter sufficient to properly support the cushion P. The vertical tube C is provided on one side with a vertical slot $c$. A second tube E, threaded at its upper end, telescopes over the tube C and is provided with an inward-projecting pin $e$, that engages in the slot $c$ of the fixed tube C. An upper bearing-plate B' is run on the thread at the upper end of the sliding tube E, and above and on the bearing-plate B' rest the clip-pieces which hold the supports of the saddle proper. As shown in the drawings, these supports are two spring-rods S S, which reach from the front to the rear of the saddle and are curved between the two points of attachment, and at the lowest point of the curve pass between the clip-pieces K K'. The two clip-pieces K K' are each provided with a hole through which the sliding tube E passes, and the parts are all held together by a nut N.

Between the bearing-plates B B' is inserted a cushion P, and this cushion is made in the form of a ring, the central perforation of which is utilized as a passage-way through which the fixed tube C and the sliding tube E pass. The cushion P is made of some air-tight material and is provided with means through which it may be inflated and by which the air will be retained in the cushion.

Any desired form of saddle may be used above the cushion, and the seat of the saddle is entirely removed from it, thus enabling the user to use either a hard or soft seat or a seat of any desired shape, while having the cushioning features of a pneumatic bearing under the saddle.

I do not wish to confine myself to the peculiar sliding joint or connection by which the seat is attached to the clip used to secure the whole device to the frame of the vehicle, as it is within the range of any ordinary mechanic to substitute for the sliding connection described another or others which produce the same result, the result being the vertical reciprocation of the seat, while it is held from rocking or twisting; nor do I wish to confine myself to the use of this pneumatic cushion with any special form of seat or saddle, as it may be used with either the saddle shown in the drawings or with any other form of seat; nor do I wish to confine myself to the particular form or shape of the cushion, as I consider the essential feature of the invention to consist in the interposition of the pneumatic cushion between the support and an overlying seat so arranged that, while the cushion characteristics may be utilized to their fullest extent, the seat, with the exception of its vertical movement, will be held rigidly in its place. So, also, the connection A may be raised to accord with the various classes of vehicles with which the seat is used.

What I claim is—

1. In combination with a seat for vehicles, a bearing-plate and means for securing said plate to the seat, a tube projecting centrally downward from said plate, a second bearing-plate provided with a central post projecting upward and adapted to engage within said tube, means for engaging the lower bearing-plate to a saddle-arm, and a pneumatic cushion interposed between said plates, substantially as described.

2. The combination of the bearing-plate B′, provided with central tube E, clip-pieces K, K′, and nut N, a bearing-plate B provided with means whereby it may be secured to a vehicle, and with a central post adapted to engage the tube E, and a pneumatic cushion interposed between said plates B, B′, substantially as described.

3. In a vehicle-seat, the combination with a circular pneumatic cushion, of a lower bearing-plate adapted to engage the under side of said cushion, a central post arranged to project upward through the center of the cushion, and having its lower end rigidly secured to said lower bearing-plate, a tube adapted to telescope over said central post, and provided with an external thread at its upper end, means adapted to engage with the central post whereby the telescoping movement of said post and tube is limited, an upper bearing-plate adapted to engage the upper side of said cushion provided with a central opening to fit over and firmly engage said tube at a point about midway between its two ends, a clip consisting of two parts each of which is provided with an opening adapted to fit over the threaded portion of the tube, said two parts being formed to receive between them the seat-frame, and a nut adapted to fit the upper end of said threaded tube whereby said clip is firmly secured, substantially as described.

4. As an article of manufacture, the combination of a cushion, bearing-plates arranged to engage the upper and lower sides of said cushion, means for securing the lower plate to a vehicle-frame, and means for engaging said bearing-plates whereby they are allowed a limited vertical movement, with an externally-threaded stem rigidly secured to and projecting above said upper bearing-plate, a clip-piece provided with a central opening to fit over and engage snugly said stem and upper bearing-plate, a second clip-piece provided with a central opening to fit loosely over said stem, and a nut upon the upper threaded portion of the stem whereby a seat-frame is firmly clamped between said clip-pieces, substantially as described.

In testimony whereof I sign this specification in the presence of two witnesses.

JOHN F. WILMOT.

Witnesses:
MARION A. REEVE,
VIRGINIA M. CLOUGH.